(12) United States Patent
Martin et al.

(10) Patent No.: US 7,390,151 B2
(45) Date of Patent: Jun. 24, 2008

(54) HELICAL CUTTER HEAD AND HELICAL CUTTING BLADE FOR USE THEREWITH

(75) Inventors: Raymond L. Martin, Marinette, WI (US); Russell L. Martin, Peshtigo, WI (US)

(73) Assignee: Great Lakes Custom Tool Mfg., Inc., Peshtigo, WI (US)

( * ) Notice: Subject to any disclaimer, the term of this patent is extended or adjusted under 35 U.S.C. 154(b) by 0 days.

(21) Appl. No.: 11/374,949

(22) Filed: Mar. 14, 2006

(65) Prior Publication Data

US 2007/0217873 A1     Sep. 20, 2007

(51) Int. Cl.
B26D 1/12    (2006.01)
(52) U.S. Cl. ............................. 407/49; 407/41; 407/94
(58) Field of Classification Search .................... 407/49, 407/41, 94
See application file for complete search history.

(56) References Cited

U.S. PATENT DOCUMENTS

| | | | |
|---|---|---|---|
| 2,822,839 A * | 2/1958 | Frodermann | 144/230 |
| 3,444,781 A | 5/1969 | Sunderman et al. | |
| 3,664,677 A | 5/1972 | Sunderman et al. | |
| 3,672,017 A * | 6/1972 | Nielsen et al. | 407/49 |
| 3,725,988 A | 4/1973 | Sunderman et al. | |
| 4,074,737 A | 2/1978 | Stewart | |
| 4,215,955 A * | 8/1980 | Lillie | 407/42 |
| 4,219,292 A * | 8/1980 | Hoffmann et al. | 407/63 |
| 4,764,059 A * | 8/1988 | Wale | 407/42 |
| 5,395,186 A * | 3/1995 | Qvart | 407/46 |
| 5,603,365 A | 2/1997 | Stewart | |
| 5,647,699 A | 7/1997 | Martin et al. | |
| 5,653,275 A | 8/1997 | Stewart | |
| 5,738,156 A | 4/1998 | Stewart | |

OTHER PUBLICATIONS

Metric Catalogue Helical Carbide Cutting Tools brochure; undated; 4 pages; Distributed by Sonnet International, Hawthorne, California.
True Helix Carbide Milling Cutters brochure; Copyright 1984 Sonnet Tool; 8 pages; Distributed by Sonnet Tool, Hawthorne California.
New Long Length Helical Carbide End Mills brochure; Printed Jul. 1987; 3 pages; Distributed by Sonnet Tool, Hawthorne, California.
Long Flute Shell Mill Fly Cutter/3-D Grip End Mills flyer; undated; 1 page; Sonnet Tool, Hawthorne, California.
New Submicron Carbide flyer; undated; 1 page; Sonnet Tool, Hawthorne, California.
2 Flute Ball End Mills/4 Flute Ball End Mills flyer; undated; 1 page; Sonnet Tool, Hawthorne, California.

* cited by examiner

Primary Examiner—Willmon Fridie, Jr.
(74) Attorney, Agent, or Firm—Reinhart Boerner Van Deuren P.C.

(57) ABSTRACT

A rotary cutter head is provided with helical carbide cutting blade inserts. The blade inserts extend along a helical path and are configured for cutting rotation in a predetermined direction. The blade inserts are secured to the cutter head body in a helical slot formed between a wall of the cutter head body and a plurality of clamping wedges. The blade insert may have a tapered body that facilitates locking and securing the blade insert to the cutter head body in a radial direction in response to centrifugal forces created as the rotary cutter head rotates.

11 Claims, 5 Drawing Sheets

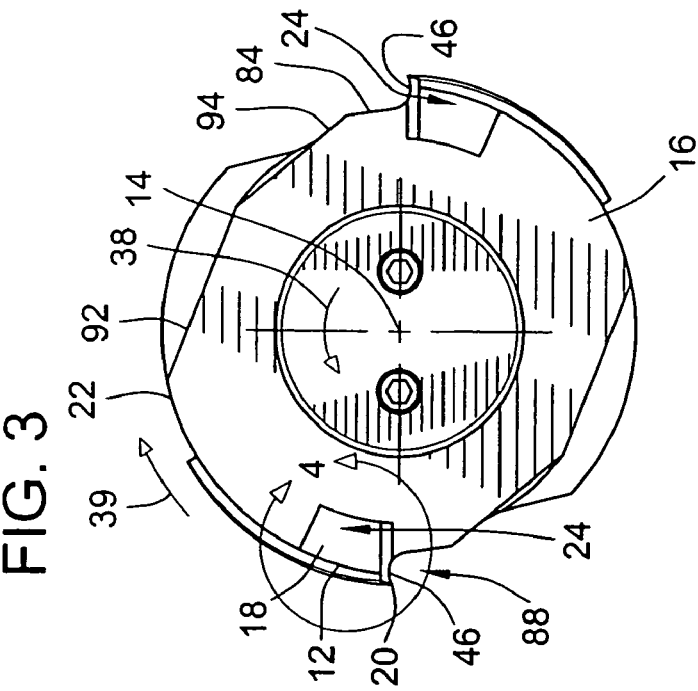
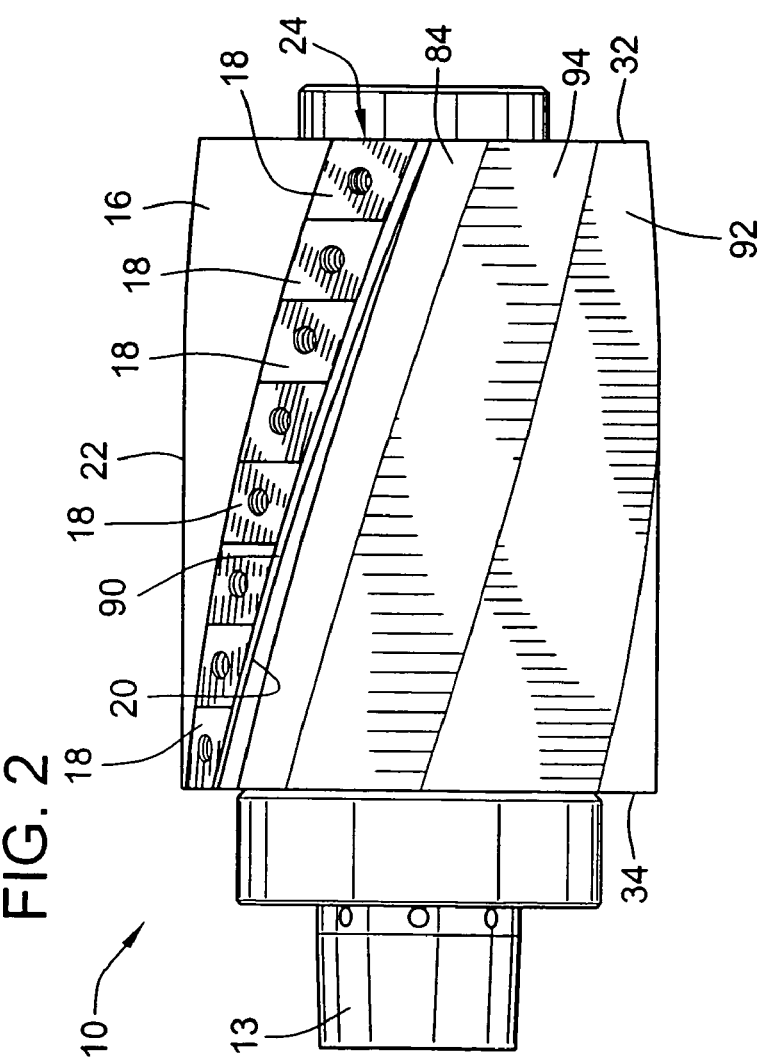
FIG. 3
FIG. 2

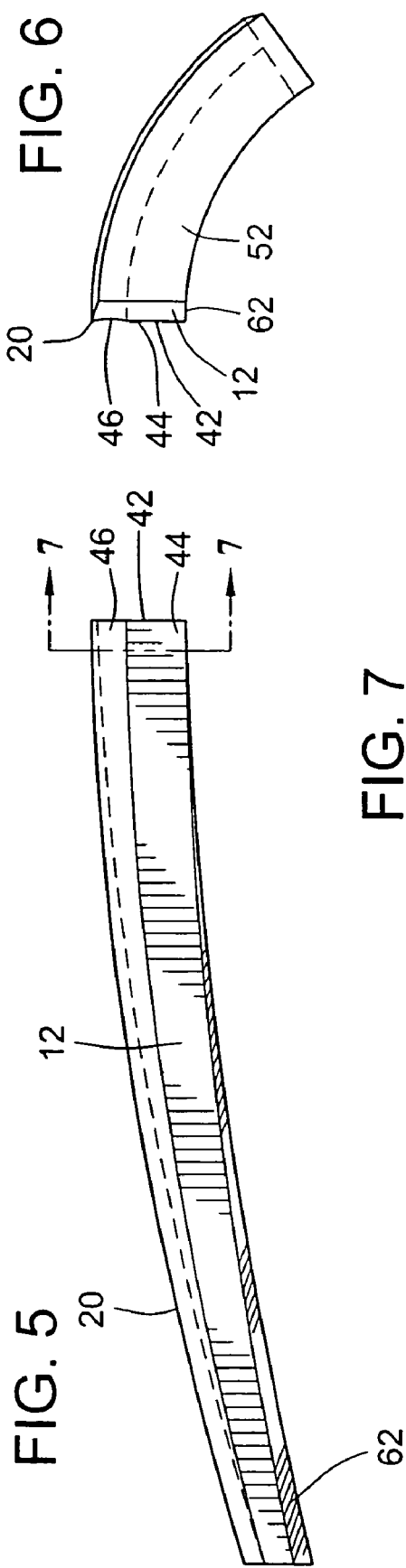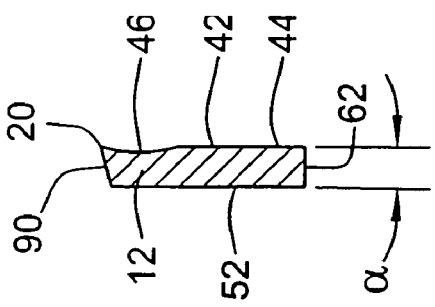

HELICAL CUTTER HEAD AND HELICAL CUTTING BLADE FOR USE THEREWITH

FIELD OF THE INVENTION

The present invention generally relates to helical cutting tools and more specifically to helical cutting tools having removable and replaceable helical cutting blade inserts.

BACKGROUND OF THE INVENTION

Rotary cutting heads having replaceable cutting blade inserts are well known as exemplified, for example, by U.S. Pat. No. 5,647,699. Additionally, helical rotary cutter heads with replaceable carbide blade inserts are also well known as shown, for example, in U.S. Pat. No. 3,725,988 to Sunderman et al., assigned to Sonnet Tool and Manufacturing Company. These types of rotary cutter heads incorporated carbide material which is known for excellent hardness characteristics, long life and durability.

For many years, Sonnet Tool and Manufacturing Company had provided helical carbide cutting tools and replaceable carbide cutting blades, which have been traditionally sold under the HELICARB trademark. Recently, the present assignee of the instant invention acquired Sonnet Tool and Manufacturing Company, and has continued to provide similar products under the HELICARB trademark. While the HELICARB products have satisfied a significant industry need, the inventors of the present invention have realized certain long existing drawbacks of helical cutting tools and particularly carbide helical cutting tools, to which the improvements of the present invention are directed.

BRIEF SUMMARY OF THE INVENTION

One aspect of the present invention is to provide a helical cutting tool that can provide for cleaner operation and/or more effective chip removal. According to this aspect, the helical cutting tool may take the form of a rotary cutter head which is configured to rotate in a predetermined direction about a rotational axis. At least one clamp, which may take the form of a plurality of clamping wedges, is arranged to provide support for a cutting blade insert along a helical path. The helical slot for receipt of a cutting blade insert is formed by the combination of the cutter head body and the one or more clamps. It is a feature of the present invention that the clamps are disposed along the backside rather than the front side of the slot and cutting blade insert. In particular, the slot has a front wall formed by the cutter head body and a rear wall formed by the one or more clamps with the front wall being disposed in front of the rear wall relative to the predetermined direction of rotation of the cutter head body. A helical cutting blade insert is clamped into the slot by the one or more clamps. This clamping arrangement better ensures clearer operation in that chips generated during cutting operations do not clog openings in or between clamps.

Another aspect of the present invention is directed toward the cutting blade insert itself apart from the rotary cutter head. According to this aspect, the cutting blade insert comprises a helical blade body that extends along a helical path about a rotational axis. The blade includes a helical cutting edge locking means as formed into the blade body. The locking means causes the blade body to be locked radially inward against centrifugal force during rotation when the cutting blade is installed in the helical slot of a rotary cutter head.

The locking means may take the form of a widened portion radially inward along or proximate the base of the cutting blade insert. A preferred implementation of this is to provide corresponding tapered walls between the helical cutting blade insert and the helical slot which is formed by the combination of the cutter head and the one or more clamps. It has been realized that even the slightest taper can provide for significant benefit. The tapered surface radially locks the cutting blade insert inwardly and ensures more precise positioning of the cutting blade inserts when installed in the rotary cutter head. This is particularly advantageous when multiple different cutting blade inserts are installed on a rotary cutter head. The tapers can be integrally formed into the carbide material of the cutting blade insert.

A preferred implementation of the present invention is a carbide cutting tool wherein the helical cutting blade insert is made from carbide (the rotary cutter head may be made from steel material or aluminum).

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 2 and 3 are side and end views of the rotary cutter head shown in FIG. 1, respectively.

FIGS. 5 and 6 are side and end views of the blade insert for use in the rotary cutter head shown in FIG. 1, respectively.

FIG. 7 is a cross-section of the blade insert shown in FIGS. 5 and 6.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
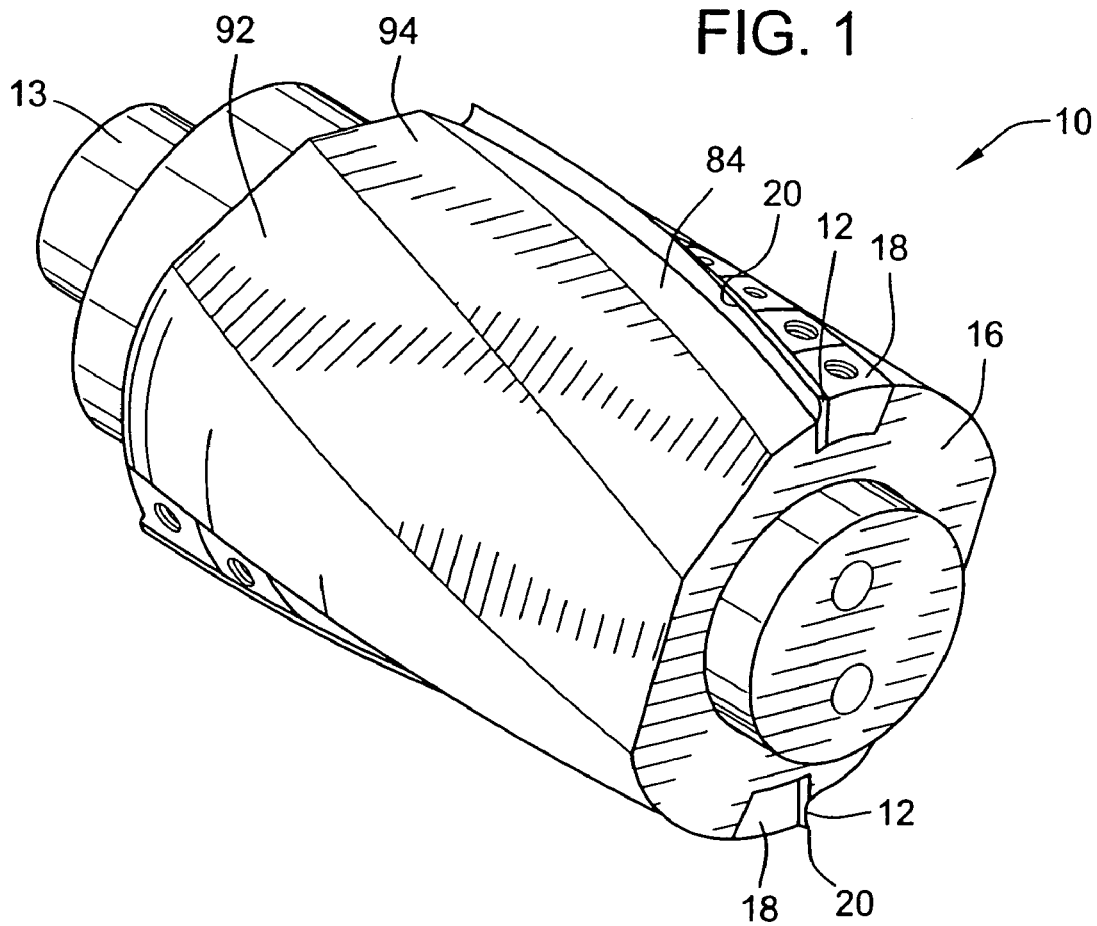
FIG. 1 is an isometric view of a rotary cutter head having a blade insert having a helical shape and made of carbide in accordance with a preferred embodiment of the present invention.

Referring to FIG. 1, a rotary cutter head 10, having a helically shaped blade insert 12 in accordance with the present invention is illustrated. The rotary cutter head 10 is used with industrial rotary machining tools such as milling machines for routing, shaping, molding, etc., for precise cutting and milling of various work pieces of such non-metallic materials as wood, plastic, etc., or metal materials as steel, titanium, cast iron and the like.

The milling machine drives the rotary cutter head 10 about an axis of rotation 14 (see FIG. 3) in a predetermined direction. The rotary cutter head 10 connects to the milling machine with connection means 13 (see FIGS. 1 and 2). As illustrated, the rotary cutter head 10 is configured to rotate in a single predetermined direction 38 about the axis of rotation 14. The direction of rotation for the disclosed embodiment, as viewed in FIG. 3 and indicated by arrow 38, is counter-clockwise about the axis of rotation 14.

As shown in FIG. 1, the rotary cutter head 10 of the present invention generally includes a cutter head body 16, blade inserts 12 and a plurality of clamping wedges 18. The blade inserts 12 provide cutting edges 20 for the rotary cutter head 10 and are secured to the cutter head body 16 by a plurality of clamping wedges 18. In a preferred embodiment, the blade inserts 12 are manufactured from carbide and the cutter head body 16 and clamping wedges 18 are manufactured from steel. The blade inserts 12 are wedged between a portion of the cutter head body 16 and the clamping wedges 18. Embodiments of the rotary cutter head 10 may include any number of blade inserts 12, but typically more than one, and typically with a balanced orientation (e.g. the blades being equally spaced apart at angular intervals).

As is best illustrated with reference to FIGS. 1-4 and 12, the outer periphery 22 of the cutter head body 16 includes helical channels generally indicated at 24. The channels 24 provide an area/void for receiving the clamping wedges 18 and the blade inserts 12. Each channel 24 includes a leading wall 26 and a trailing wall 28 extending radially inward. The leading wall 26 is forward of the trailing wall 28 relative to the predetermined direction of rotation of the rotary cutter head 10. In addition, the leading wall 26 extends along a helical path that is substantially parallel to a helical path of the trailing wall 28.

As shown in FIG. 2, the helical channels 24 extend between opposed axial ends 32, 34 of the cutter head body 16. The helical channels 24 also extend angularly about the axis of rotation 14 of the rotary cutter head 10. The helical shape is preferably configured with respect to the predetermined direction of rotation 38. Specifically, the helical channels 24 preferably coil about the axis 14 in a direction opposite the predetermined direction of rotation. In the illustrated embodiment, the rotary cutter head 10 is designed to rotate counter-clockwise (see arrow 38 in FIG. 3). As a result, the helical channels 24 extend angularly in the opposite clockwise direction, indicated by arrow 39, when moving in an axial direction from the distal 32 end to the connection end 34. Conversely, if the rotary cutter head 10 is designed to rotate clockwise, when viewed up the axis of rotation 14 from the distal end 32 to connection end 34, the helical channels 24 would preferably extend angularly in the counter-clockwise direction.

At least one clamp and preferably multiple clamps in the form of clamping wedges 18 secure the blade insert 12 within the helical channel 24. The blade insert 12 has a helical shape and extends along a helical path. In a preferred embodiment, the blade insert 12 is manufactured from carbide. As best illustrated with reference to FIGS. 1 and 2, the helical path and contour of the blade insert 12 is the same as the helical path and contour of the helical channel 24.

Figure 4:
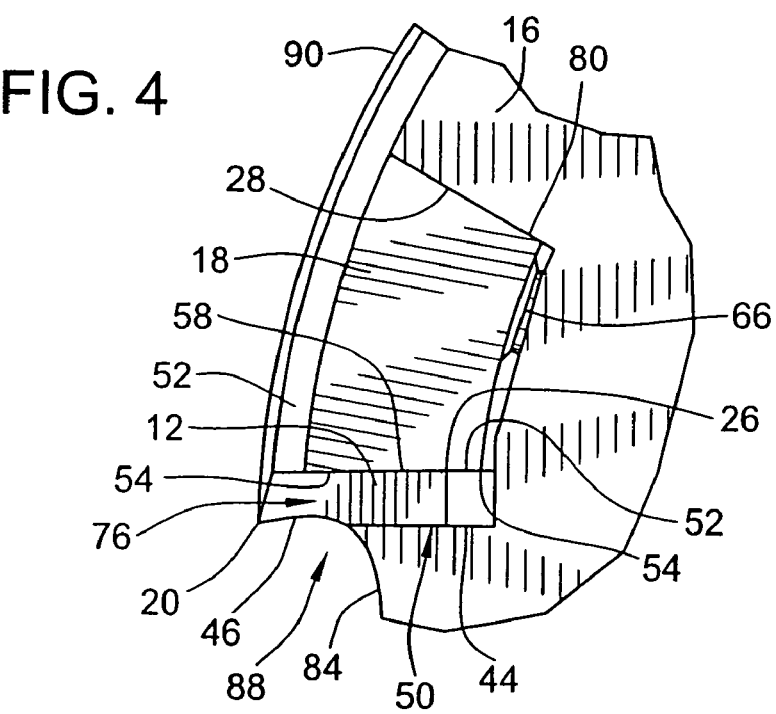
FIG. 4 is an enlarged partial end view of the rotary cutter head shown in FIG. 1, illustrating the securement of the blade insert.
Figure 8:
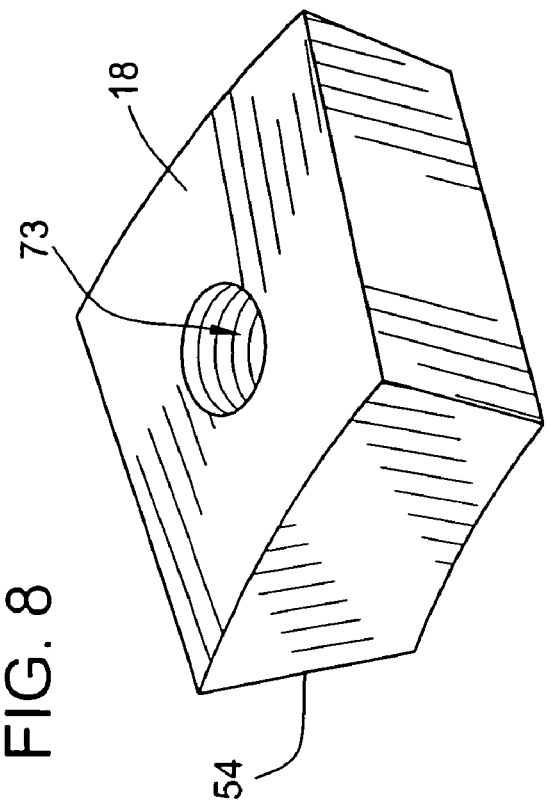
FIG. 8 is an isometric view of one of the clamping wedges as used in the rotary cutter head illustrated in FIG. 1.
Figure 9:
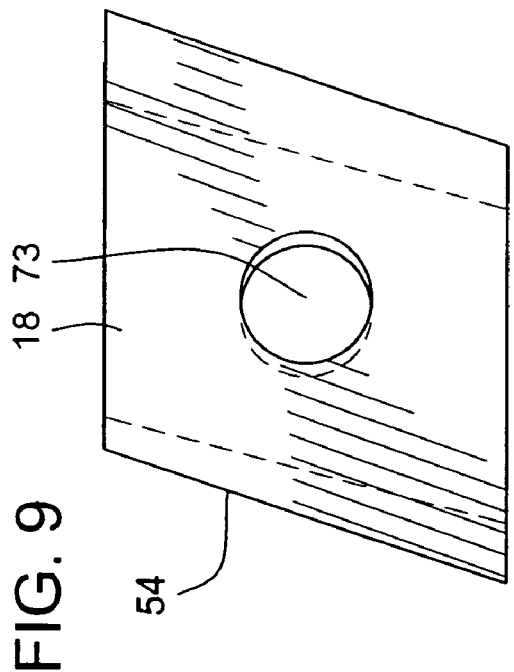
FIGS. 9, 10 and 11 are plan, side and end views of the clamping wedge shown in FIG. 8, respectively, with hidden lines showing threaded hole and profile details.
Figure 10:
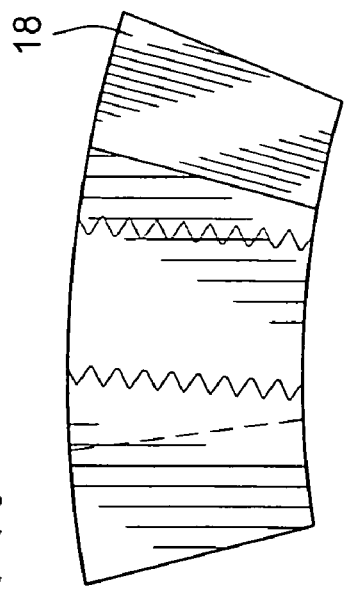
Figure 11:
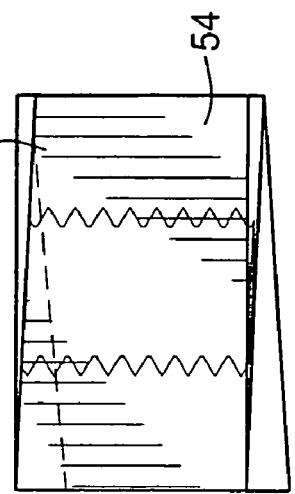

The blade insert 12 is secured and locked to the cutter head body 16 by being wedged in a slot 76, defined between the leading wall 26 of the helical channel 24, and the front face/wall 54 of the clamping wedges 18 collectively. Best illustrated with reference to FIGS. 5 and 7, the leading face 42 of the blade insert 12 has a straight portion 44 (straight at least in the radial direction), a curved recess portion 46, and a top edge, which provides the cutting edge 20. As shown in FIG. 4, the straight portion 44 abuts with the leading wall 26 of the helical channel 24 at interface 50. A trailing face 52 (see FIGS. 6 and 7) of the blade insert 12 abuts with a front face 54 of the clamping wedge 18 at interface 58. In accordance with an aspect of the present invention, the blade insert 12 is forward of the clamping wedges 18 to prevent unnecessary and excessive wear on the clamping wedge 18 as well as to prevent waste material from collecting on the clamping wedge 18, or from obstructing fastener openings. Importantly, this provides for cleaner operation, particularly when cutting wood chips which would have a greater tendency to clog and collect in openings.

As illustrated in FIG. 7, the straight portion 44 of the leading face 42 and the trailing face 52 of the blade insert 12 are not parallel and are tapered relative to one another at an angle $\alpha$ in the radial direction relative to the axis 14. The angle $\alpha$ between the straight portion 44 of the leading face 42 and the trailing face 52 is such that the bottom 62 of the blade insert 12 is wider than the outer periphery of the blade insert 12. The angle $\alpha$ may be approximately between about one-half of a degree and about two degrees, and in the illustrated embodiment is about one degree. This tapered profile increases the clamping force on the blade insert 12 and radially locks the blade insert 12 to the rotary cutter head 10.

Figure 12:
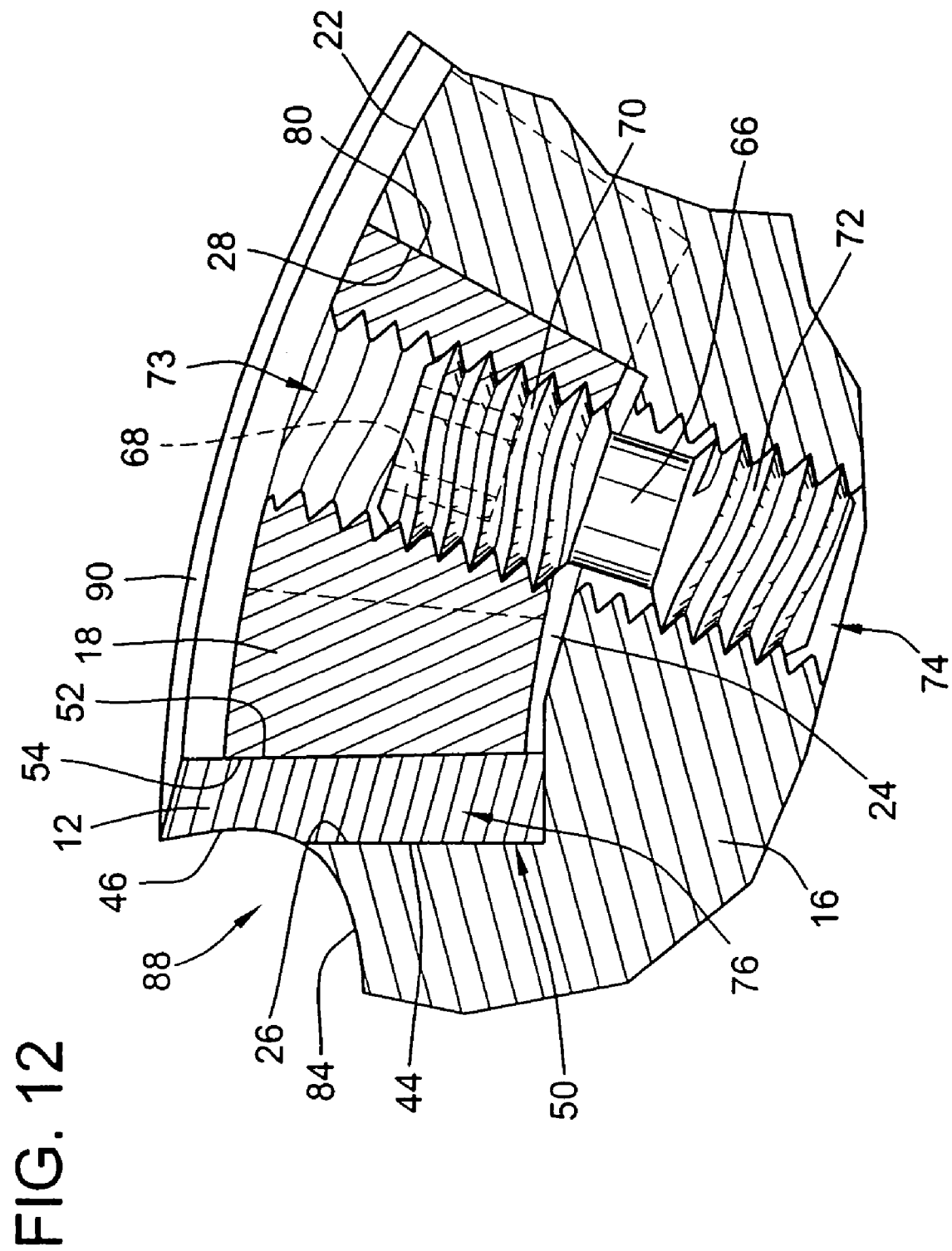
FIG. 12 is a cross-sectional illustration of the rotary cutter head detail shown in FIG. 4.

Each of the clamping wedges 18 are threadedly secured to the cutter head body 16 by a fastener that may take the form of a compound screw 66, as illustrated in FIG. 12. The compound screw 66 includes a tool engagement socket 68, illustrated by dashed lines, for engaging the compound screw 66. For example, the tool engagement socket 68 may be a hex socket for receipt of and engagement with an allen wrench (not shown). The compound screw 66 is a screw that has both a portion of right handed threads 70 and a portion of left handed threads 72 about the same axis of rotation. The right hand threads 70 threadedly engage an internally threaded bore 73 of the clamping wedge 18, and the left hand threads 72 engage an internally threaded bore 74 of the cutter head body 16. Thus, as the compound screw 66 is turned, it concurrently threads into or out of both the clamping wedge 18 and the cutter head body 16.

As the compound screw 66 is concurrently threaded into the clamping wedge 18 and the cutter head body 16, the clamping wedge 18 is tightened, and specifically, drawn radially inward and towards the cutter head body 16 and into the helical channel 24. The clamping wedge 18 in combination with the helical channel 24 form the blade receiving slot 76 between the leading wall 26 of the helical channel 24 and the front face 54 of the clamping wedge 18.

The blade receiving slot 76 is helical having the same helical shape and contour as the helical channel 24 and the blade insert 12. With the clamping wedges 18 aligned sided by side and secured to the cutter head body 16 within the helical channel 24, as illustrated in FIGS. 1 and 2, the blade receiving slot 76 extends between opposed ends 32, 34 of the cutter head body 16. To establish the helical path, each clamping wedge 18 is partially angularly offset from one another in the angular direction 39 of the helical path about axis of rotation 14. Furthermore, the leading faces 54 of the clamping wedges 18 that provide support for the blade insert 12 are configured such that there is a smooth transition from one clamping wedge 18 to the next and the trailing face 52, and consequently, the blade insert 12, is fully supported by the clamping wedges 18 collectively.

The leading face 26 of the helical channel 24 and the leading face 54 of the clamping wedge 18 are tapered to cooperate and co-act with the taper of the blade insert 12 illustrated in FIG. 7. Specifically, the blade receiving slot 76 is tapered such that it is wider radially inward towards the axis of rotation 14. Furthermore, the width of a radially outer portion of the blade receiving slot 76 is narrower than the width of the bottom 62 of the blade insert 12. By having the bottom 62 of the blade insert 12 wider than a radially outer portion of the blade receiving slot 76, the clamping wedges 18 positively lock the blade insert 12 in the radial direction. The inward positive locking arrangement opposes centrifugal forces applied to the blade insert 12 resulting from high speed rotation of the rotary cutter head 10 during use.

During assembly, the clamping wedge 18 is tightened down wedging it between the blade insert 12 and the trailing wall 28 of the helical channel 24. As the front face 54 of the clamping wedge 18 is wedged against the trailing face 52 of the blade insert 12, the clamping wedge 18 imparts a tangential load on the blade insert 12 further securing the blade insert 12 to the cutter head body 16.

When the blade insert 12 is clamped to the cutter head body 16, the curved recess portion 46 of the blade insert 12 extends radially beyond a portion of the outer periphery 84 of the cutter head body 16 immediately forward of the helical channel 24, as shown in FIG. 4. The profile of the curved recess portion 46 of the blade insert 12 ensures the cutting edge 20 of the blade insert 12 contacts the work piece first and provides a sharp cutting edge.

The cutter head body 16 also has a helical flute 88 in front of the blade insert 12 that serves as a debris and waste material clearance channel. Metal, wood or composite shavings that are created when machining a work piece are expelled from in front of the blade insert 12 by the helical clearance flute 88. As the cutting edge 20 separates chips and shavings of waste material from the work piece, the helical shape of the helical flute 88 causes waste material to expel axially.

To better facilitate shaving and chip removal, the clearance flute 88 established by the cutter head body 16 has a smooth continuous helical curvature providing a smooth surface and transition between the blade insert 12 and cutter head body 16.

As best illustrated in FIGS. 4 and 7, the blade insert 12 has a tapered outer peripheral surface 90 to better define the cutting edge for engagement with the work piece. By having the outer surface 90 canted away and radially inward from the cutting edge 20, the outermost part of the assembled rotary cutter head 10 is the cutting edge 20. The radially inward tapering of the outer peripheral surface 90 also provides clearance to prevent the canted top surface from contacting the work piece.

As illustrated in FIGS. 2 and 3, the outer periphery 22 of the cutter head body 16 has stepped surfaces 92 and 94 that extend through a helical path. The stepped surfaces 92 and 94 and the curved surface 84 reduce the radial thickness of the cutter head body 16 in front of the blade insert 12. Specifically, the stepped surfaces 92 and 94 and curved surface 84 increase the exposure of the blade insert 12 to the work piece.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rotary cutter head comprising:
    a cutter head body configured to rotate in a predetermined direction about an axis of rotation;
    at least on clamp arranged to provide support along a helical path,
    a helical slot formed by the combination of the cutter head body and the at least one clamp along the helical path, the slot having a front wall formed by the cutter head body and a rear wall formed by the at least one clamp, wherein the front wall is forward of the rear wall relative to the predetermined direction;
    a helical cutting blade insert clamped into the slot by the at least one clamp;
    a helical flute formed in the cutter head body in front of the helical cutting blade insert, the helical flute adapted to facilitate chip removal, the helical flute terminating in the front wall of the slot; and
    wherein a radial outer extent of the rear wall of the slot formed by at least one clamp is spaced radially farther away from the axis than a radial outer extent of the front wall relative to the axis.

2. The rotary cutter head of claim 1, wherein the helical cutting blade insert is made from carbide.

3. The rotary cutter head of claim 1, wherein the slot includes a wider portion radially inward from an outer portion to provide means for radially locking the helical cutting blade insert in the slot.

4. The rotary cutter head of claim 3, wherein the locking means comprises corresponding tapers between the slot and the helical cutting blade insert.

5. The rotary cutter head of claim 4, wherein the at least one clamp comprises a plurality of clamping wedges residing in a helical channel defined by the cutter head body.

6. The rotary cutter head of claim 5, wherein multiple helical channels clamping wedges and helical cutting blades are arranged at different angular positions about the axis of rotation.

7. The rotary cutter head of claim 6, wherein the helical cutting blade inserted is made from carbide.

8. A cutting blade insert, comprising a carbide blade body extending along a helical path about a rotational axis, the carbide blade body defining a base portion and an cutting tip portion, the cutting tip portion defining a helical cutting edge, the base portion including a pair of walls that taper outwardly as the base portion extends toward the rotational axis, wherein the walls taper between about 0.5 and about 2 degrees, wherein the carbide blade body includes a leading face, a trailing face, a base surface and an outer surface, the leading and trailing faces extending radially outward relative to the rotational axis from the base surface to the outer surface, wherein the outer surface and the leading face intersect to define the helical cutting edge, further comprising a concave recess extending along the helical path and formed into leading face between the cutting edge and the base portion, said tapered walls at least formed in part by the leading and trailing faces.

9. A cutting blade insert intended for use with a cutter head, the cutter head having a helical slot for receiving the cutting blade insert, the cutting blade insert comprising:
 a blade body extending along a helical path about a rotational axis, the blade including a helical cutting edge; and
 means formed into the blade body for locking the blade body radially inwardly against centrifugal force during rotation about the rotational axis when the cutting blade insert is installed in the helical slot; and
 wherein the blade body includes leading face, a trailing face, a base surface and an outer surface, the leading and trailing faces extending radially outward relative to the rotational axis from the base surface to the outer surface, the outer surface extending transversely between the leading face and the trailing face and intersecting the leading face to form the helical cutting edge, said means comprises tapering of the leading and trailing faces inwardly toward each other as the leading and trailing faces extend toward the outer surface.

10. The cutting blade of claim 9, wherein the locking means comprises a portion that is wider radially inward from a narrow portion radially outward therefrom and relative to the rotational axis, the narrow portion engaging a wall of the helical slot when installed therein at a position radially outward of the wide portion.

11. A cutting blade insert intended for use with a cutter head, the cutter head having a helical slot for receiving the cutting blade insert, the cutting blade insert comprising:
 a blade body extending along a helical path about a rotational axis, the blade including a helical cutting edge; and
 means formed into the blade body for locking the blade body radially inwardly against centrifugal force during rotation about the rotational axis when the cutting blade insert is installed in the helical slot;
 wherein said means comprises a pair of tapered walls formed into the blade body that taper inwardly toward each other as the tapered walls extend radially outwardly; and
 wherein the carbide blade body includes a leading face, a trailing face, a base surface and an outer surface, the leading and trailing faces extending radially outward relative to the rotational axis from the base surface to the outer surface, wherein the outer surface and the leading face intersect to define the helical cutting edge, further comprising a concave recess extending along the helical path and formed into leading face between the cutting edge and the base portion, said tapered walls at least formed in part by the leading and trailing faces.

* * * * *